United States Patent
Hwang et al.

(10) Patent No.: US 6,414,943 B1
(45) Date of Patent: Jul. 2, 2002

(54) METHOD AND APPARATUS FOR CONTROLLING ASYMMETRIC DYNAMIC RADIO BEARERS IN MOBILE PACKET DATA COMMUNICATIONS SYSTEM

(75) Inventors: In Tea Hwang; Sang Rim Shin; Myoung Jin Ok, all of Kyonggi-do (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 09/374,763

(22) Filed: Aug. 16, 1999

(30) Foreign Application Priority Data

Aug. 17, 1998 (KR) .......................................... 98-33308

(51) Int. Cl.⁷ ............................................... H04B 7/00
(52) U.S. Cl. ...................................................... 370/310
(58) Field of Search .................................. 370/432, 348, 370/524, 330–338, 241, 484, 466, 328, 360, 310; 375/240.01, 260, 114–123, 127, 219–230; 455/426, 450, 524, 352, 561, 422, 69; 343/844

(56) References Cited

U.S. PATENT DOCUMENTS

| | | | | |
|---|---|---|---|---|
| 5,377,192 A | * | 12/1994 | Goodings et al. | 370/348 |
| 5,598,407 A | * | 1/1997 | Bud et al. | 370/330 |
| H1641 H | * | 4/1997 | Sharman | 370/338 |
| 5,722,072 A | | 2/1998 | Crichton et al. | 406/439 |
| 5,793,744 A | | 8/1998 | Kanerva et al. | 690/262 |
| 6,127,988 A | * | 10/2000 | McNichol | 343/844 |
| 6,173,162 B1 | * | 1/2001 | Dahlman et al. | 455/69 |
| 6,208,633 B1 | * | 3/2001 | Jouppila et al. | 370/338 |

FOREIGN PATENT DOCUMENTS

WO  WO 93/10600  5/1993  ................ 455/53.1

OTHER PUBLICATIONS

Laura Bonzano and Valerio Palestini, "DECT Performance in the Wireless PBX Application", Feb. 1993, IEEE International Conference, vol. 2, pp. 1269–1273.*

Wong, P.; Lasa, A.; Halsall, F.; Schultes, G., "Performance of multi–bearer connections for varied data service system", 1994, IEEE Internation Conference, vol. 1, pp. 593–597.*

Matthias Oliver Berger, Olaf Kubitz and Thomas Rochner, "Asymmetric Data Communication using DECT in an Industrial Environment", Mar. 1997, IEEE 47th, vol. 3, pp. 2099–2102.*

* cited by examiner

Primary Examiner—Wellington Chin
Assistant Examiner—Prenell Jones
(74) Attorney, Agent, or Firm—Fleshner & Kim, LLP

(57) ABSTRACT

The method and apparatus for controlling asymmetric dynamic radio bearers in a mobile packet data communications system involves use of the radio bearers for the specified data rate corresponding to the data rate according to the radio packet data service to activate a predetermined number of radio bearers only according to the amount of transmit data and vary the data rate, thereby making it possible to efficiently use the radio resources and prevent excessive power consumption and signal interference. The method for controlling asymmetric dynamic radio bearers in a mobile packet data communications system includes the steps of: (a) establishing a plurality of radio bearers having a predetermined data rate; (b) examining the amount of data stored in a transmit buffer during transmission of mobile packet data; and (c) transmitting the mobile packet data with the number of the radio bearers increased or decreased according to the amount of data.

17 Claims, 2 Drawing Sheets

METHOD AND APPARATUS FOR CONTROLLING ASYMMETRIC DYNAMIC RADIO BEARERS IN MOBILE PACKET DATA COMMUNICATIONS SYSTEM

BACKGROUND OF THE INVENTION

1. Field of the Invention

The present invention generally relates to a mobile packet data communications system and, more particularly, to a method and apparatus for controlling asymmetric dynamic radio bearers in a mobile packet data communications system.

2. Discussion of Related Art

There have been developed and provided various services concerning data such as text, audio and video data in the recent new radio communications system, for example, PCS and IMT-2000, etc. Further, the system provides the data service at a fixed data rate in a bi-directional way.

The data rate is controlled by an MAC (Medium Access Control) provided in the individual apparatus.

Hereinafter, reference will be made in connection with the accompanying drawings as to a description of a mobile packet data communications system in accordance with prior art.

FIG. 1 is an illustrative diagram of a related art mobile packet data communications system, which includes a mobile station 1 requesting a radio data service and a network 2 providing the radio data service to the mobile station 1.

The mobile station 1 includes an MAC 1a for controlling transmit data according to the data rate corresponding to the requested radio data service and transmitting them through a transmit buffer 1b.

The network 2 includes an MAC 2a for examining the data rate corresponding to the radio data service requested by the mobile station 1 and a transmit buffer 2b through which the radio data service is transmitted to the mobile station at the data rate.

Now, a detailed description will be made as to the operation of the related art mobile packet data communications system as constructed above.

First, when the MAC 1a of the mobile station 1 requests the network 2 to provide a specified data service, the MAC 2a of the network 2 examines a fixed data rate corresponding to the data service.

Upon examining the fixed data rate, the network 2 informs the mobile station 1 of the data rate to make a condition for the data service and providing the data service for the mobile station 1 with radio bearers for the data rate.

The radio bearers for the fixed data rate are controlled respectively by the MACs 1a and 2a to provide a symmetric data service communicated between the mobile station 1 and the network 2.

In such a related art mobile packet data communications system, the packet data are transmitted by using all the radio bearers at a fixed data rate since the data rate corresponding to the data service communicated between the mobile station and the network is fixed, thereby causing problems such as inefficient utility of the radio resources, excessive power consumption and signal interference.

SUMMARY OF THE INVENTION

Accordingly, it is an object of the present invention to provide a method and apparatus for controlling asymmetric dynamic radio bearers in a mobile packet data communications system in which the data rate can be varied by activating only a part of the radio bearers for a predetermined data rate according to the amount of data to be transmitted in a specified mobile data service.

To achieve the first object of the present invention, there is provided a method for controlling asymmetric dynamic radio bearers in a mobile packet data communications system including the steps of: (a) establishing a plurality of radio bearers having a predetermined data rate; (b) examining the amount of data stored in a transmit buffer during transmission of mobile packet data; and (c) transmitting the mobile packet data with the number of the radio bearers increased or decreased according to the amount of data.

In the step (c), the amount of data stored in the transmit buffer is compared with first and second thresholds $TH_{LOW}$ and $TH_{HIGH}$, and the number of the radio bearers is decreased by one when the amount of data is lower than the first threshold $TH_{LOW}$ and increased by one when the amount of data is higher than the second threshold $TH_{HIGH}$. And, the number of the radio bearers is not changed when the amount of data stored in the transmit buffer is kept between the first and second thresholds $TH_{LOW}$ and $TH_{HIGH}$.

In the step (c), the number of the radio bearers is decreased by one when the amount of data stored in the transmit buffer keeps lower than the first threshold $TH_{LOW}$ until a predetermined time expires and increased by one when the amount of data stored in the transmit buffer keeps higher than the second threshold $TH_{HIGH}$ until the predetermined time expires.

The first and second thresholds $TH_{LOW}$ and $TH_{HIGH}$ are between hysteresis values for preventing frequent changes of the amount of data stored in the transmit buffer. The hysteresis values comprise first and second hysteresis values are opposite to each other with the first threshold $TH_{LOW}$ interposed therebetween and separated from the first threshold $TH_{LOW}$ at a predetermined distance, and third and fourth hysteresis values are opposite to each other with the second threshold $TH_{HIGH}$ interposed therebetween and separated from the second threshold $TH_{HIGH}$ at a predetermined distance.

The above steps are supported in MAC (Medium Access Control) protocols of a mobile station and a network.

Alternatively, there is provided a method for controlling asymmetric dynamic radio bearers in a mobile packet data communications system including the steps of (a) storing first and second thresholds $TH_{LOW}$ and $TH_{HIGH}$; (b) establishing a plurality of radio bearers having a predetermined data rate; (c) comparing the amount of data stored in a transmit buffer with the first and second thresholds $TH_{LOW}$ and $TH_{HIGH}$ during transmission of mobile packet data; and (d) decreasing the number of the radio bearers by one when the amount of data is lower than the first threshold $TH_{LOW}$ for a predetermined time and increasing the number of the radio bearers by one when the amount of data is higher than the second threshold $TH_{HIGH}$.

There is further provided an apparatus for controlling asymmetric dynamic radio bearers in a mobile packet data communications system including: a transmit buffer for temporarily storing transmit data according to a radio data service; and controlling means for establishing a plurality of radio bearers for transmission of the transmit data at a data rate corresponding to the radio data service, examining the amount of data stored in the transmit buffer and increasing or decreasing the number of the radio bearers.

The controlling means determines first and second thresholds for increasing or decreasing the number of the radio bearers. The first and second thresholds $TH_{LOW}$ and $TH_{HIGH}$ are between hysteresis values for preventing frequent changes of the amount of data stored in the transmit buffer. The hysteresis values include first and second hysteresis values are opposite to each other with the first threshold $TH_{LOW}$ interposed therebetween and separated from the first threshold $TH_{LOW}$ at a predetermined distance, and third and fourth hysteresis values are opposite to each other with the second threshold $TH_{HIGH}$ interposed therebetween and separated from the second threshold $TH_{HIGH}$ at a predetermined distance.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings:

Figure 3:
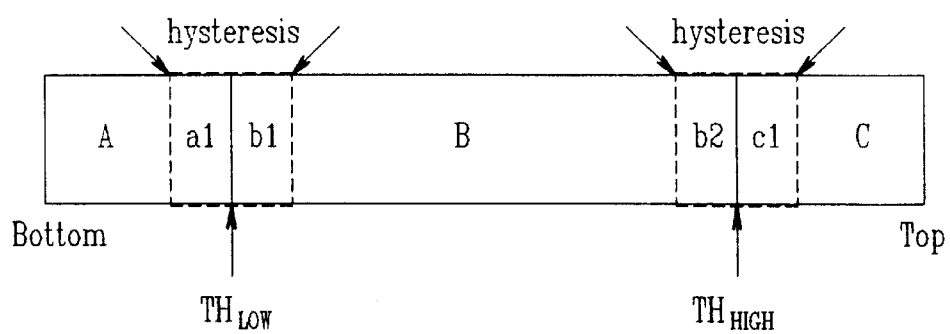
Figure 4:
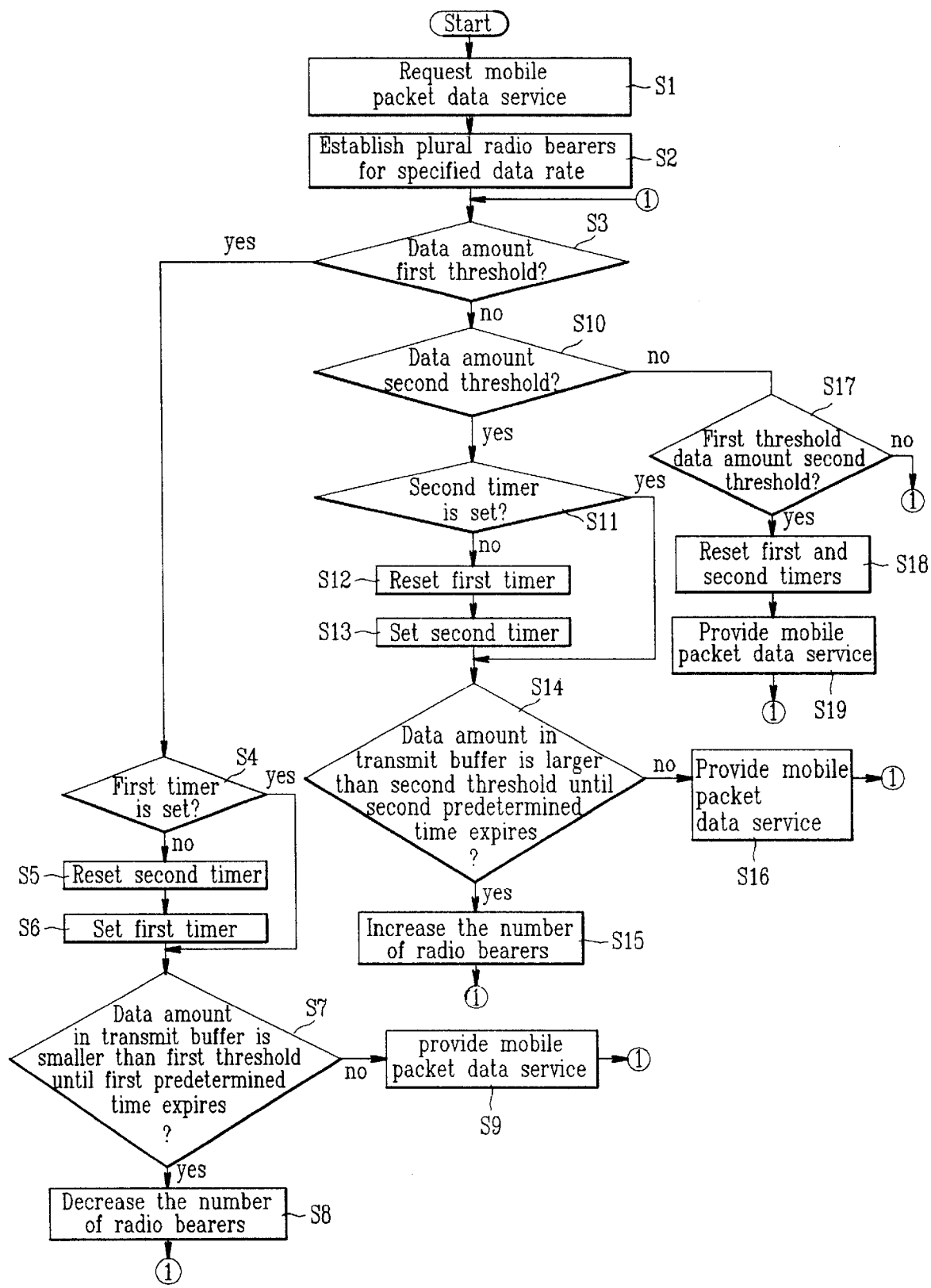

FIG. 3 is a diagram illustrating the condition of a transmit buffer controlled by the method for controlling asymmetric dynamic radio bearers in a mobile packet data communications system according to the present invention; and FIG. 4 is a flow chart illustrating a procedure for controlling asymmetric dynamic radio bearers in a mobile packet data communications system according to the present invention.

DETAILED DESCRIPTION OF PREFERRED EMBODIMENT

Hereinafter, reference will be made in connection with the accompanying drawings as to a detailed description of a method for controlling asymmetric dynamic radio bearers in a mobile packet data communications system in accordance with a preferred embodiment of the present invention.

Figure 1:
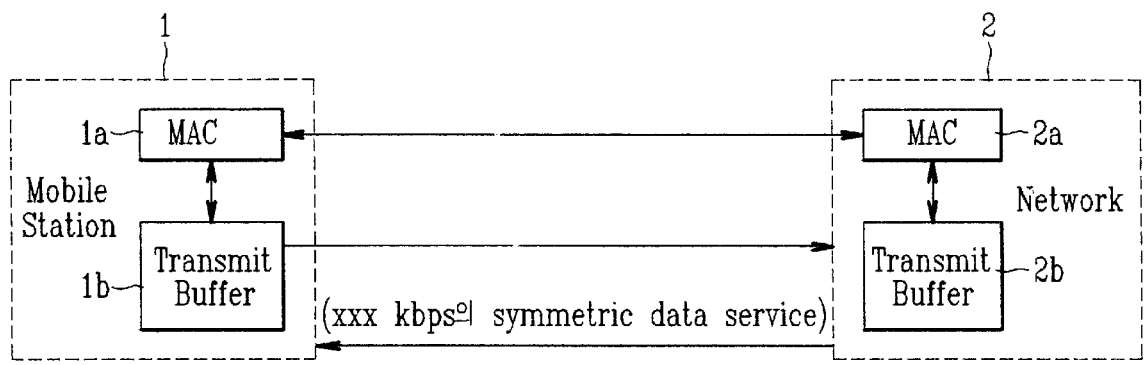
FIG. 1 is a diagram illustrating the structure of a mobile packet data communications system according to related art.

An apparatus for controlling asymmetric dynamic radio bearers in a mobile packet data communications system according to the present invention includes the same components as illustrated in FIG. 1, i.e., a mobile station 1 requesting a radio data service and a network 2 providing the radio data service to the mobile station 1. These components have their functions newly defined in the present invention.

The mobile station 1 includes a transmit buffer 1b for temporarily storing transmit data according to the requested radio data service, and an MAC 1a for establishing a plurality of radio bearers used to send the transmit data at a data rate corresponding to the radio data service and examining the transmit buffer 1b to increase or decrease the number of the plural radio bearers established.

The network 2 includes a transfer buffer 2b for temporarily storing the transmit data according to the radio data service requested by the mobile station 1, and an MAC 2a for establishing a plurality of radio bearers used to send the transmit data at a data rate corresponding to the radio data service and examining the transmit buffer 2b to increase or decrease the number of the plural radio bearers established.

Figure 2:
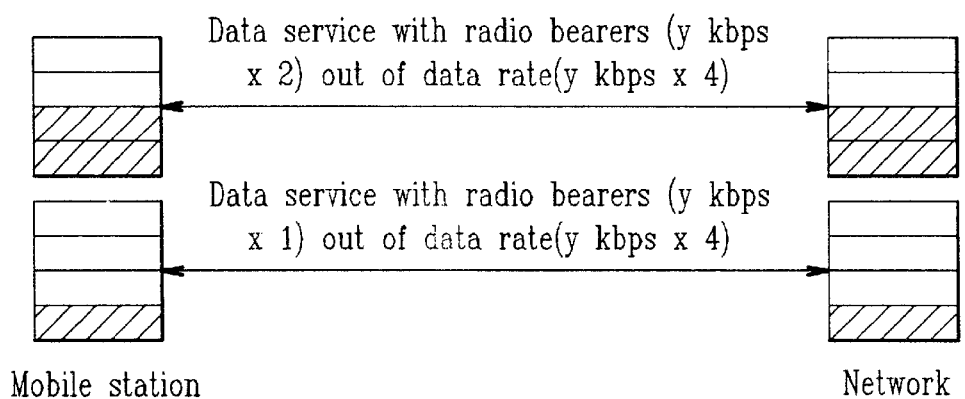
FIG. 2 is a diagram illustrating transmission of a variable radio bearer in a method for controlling asymmetric dynamic radio bearers in a mobile packet data communications system according to the present invention.

FIG. 2 illustrates transmission of a variable radio bearer in a method for controlling asymmetric dynamic radio bearers in a mobile packet data communications system according to the present invention. FIG. 3 illustrates the condition of a transmit buffer controlled by the method for controlling asymmetric dynamic radio bearers in a mobile packet data communications system according to the present invention. And, FIG. 4 is a flow chart illustrating a procedure for controlling asymmetric dynamic radio bearers in a mobile packet data communications system according to the present invention.

Now, reference will be made in connection with FIGS. 2 to 4 as to a detailed description of a method and apparatus for controlling asymmetric dynamic radio bearers in a mobile packet data communications system in accordance with the present invention.

First, the MAC 1a of the mobile station 1 requests the network 2 to provide a radio packet data service (S1).

Upon receiving a radio packet data service request message, the MAC 2a of the network 2 examines a data rate corresponding to the radio packet data service, establishing a plurality of radio bearers for the data rate as shown in FIG. 2 and sending data temporarily stored in the transfer buffer 2b to the plural radio bearers according to the radio packet data service (S2).

The mobile station 1 receives the transmit data according to the plural radio bearers for the data rate corresponding to the radio packet data service. Upon receiving the radio packet data service, the mobile station 1 sends the data corresponding to the radio packet data service or control signals, temporarily stored in the transmit buffer 1b, to the network 2 with the plural radio bearers at the data rate.

Here, FIG. 2 illustrates the station that the mobile station transmits the data service with the radio bearer (y kbps multiplied by 2) out of data rates (y kbps multiplied by 4) to the network 2 and the network 2 transmits the data service with the radio bearer (y kbps multiplied by 1) out of data rates (y kbps multiplied by 4) to the mobile station 1.

That is, the MAC 2a of the network 2 compares the amount of data temporarily stored in the transmit buffer 2b shown in FIG. 3 with a first threshold $TH_{LOW}$, and the MAC 1a of the mobile station 1 compares the amount of data corresponding to the radio packet data service or the amount of data according to the control signals, temporarily stored in the transmit buffer 1b, with the first threshold $TH_{LOW}$ (S3).

If the amounts of data stored in the transmit buffers 1b and 2b are lower than the first threshold $TH_{LOW}$, the individual MACs 1a and 2a of the mobile station 1 and the network 2 check on whether a first internal timer $T_{LOW}$ (not shown) is set. If the first timer $T_{LOW}$ is not set, the individual MACs 1a and 2a reset a second timer $TH_{HIGH}$ (not shown), setting the first timer $T_{LOW}$ at a first predetermined time and checking at predetermined time intervals on whether the amounts of data temporarily stored in the transmit buffers 1b and 2b are lower than the first threshold $TH_{LOW}$ until the first predetermined time expires (S4–S7).

If the first timer $T_{LOW}$ is set at the first time, the individual MACs 1a and 2a of the mobile station 1 and the network 2 check at predetermined time intervals on whether the amounts of data temporarily stored in the transmit buffers 1b and 2b are lower than the first threshold $TH_{LOW}$ until the first predetermined time expires, respectively.

When the amounts of data temporarily stored in the transmit buffers 1b and 2b are lower than the first threshold $TH_{LOW}$ for the predetermined time, the individual MACs 1a and 2a of the mobile station 1 and the network 2 decide that the amounts of data stored in the transmit buffers 1b and 2b are present in region "A", providing the radio packet data service with the number of the plural radio bearers for the predetermined data rate decreased by one and examining the amounts of data stored in the transmit buffers 1b and 2b at predetermined time intervals. The above procedure is repeated until the radio packet data service ends (S8).

If the amounts of data temporarily stored in the transmit buffers 1b and 2b are increased to be higher than the first threshold $TH_{LOW}$ before the first predetermined time expires, the individual MACs 1a and 2a of the mobile station 1 and the network 2 reset the first timer $T_{LOW}$, providing the radio packet data service with the plural radio bearers at the predetermined data rate and examining the amounts of data stored in the transmit buffers 1b and 2b at predetermined time intervals. The above procedure is repeated until the radio packet data service ends (S9).

On the other hand, when examining the amounts of data stored in the transmit buffers 1b and 2b at predetermined time intervals and repeating the above procedure, the individual MACs 1a and 2a of the mobile station 1 and the network 2 compare the amounts of data stored in the transmit buffers 1b and 2b with the first threshold $TH_{LOW}$ inclusive of hysteresis values. Then, the individual MACs 1a and 2a provide the radio packet data service with the number of radio bearers decreased/increased by one, or unchanged according to the comparison result.

As shown in FIG. 3, the hysteresis value includes first and second hysteresis values a1 and b1 opposite to each other with the first threshold $TH_{LOW}$ interposed therebetween and separated from the first threshold $TH_{LOW}$ at a predetermined distance, and third and fourth hysteresis values b2 and c1 opposite to each other with the second threshold $TH_{HIGH}$ interposed therebetween and separated from the second threshold $TH_{HIGH}$ at a predetermined distance.

The first and second thresholds $TH_{LOW}$ and $TH_{HIGH}$ are between hysteresis values for preventing frequent changes of the amounts of data stored in the transmit buffers 1b and 2b.

That is, in a case where the amounts of data stored in the transmit buffers 1b and 2b change from area "A" to area "B" in FIG. 3, the individual MACs 1a and 2a compare the amounts of data stored in the transmit buffers 1b and 2b with the first threshold $TH_{LOW}$ plus the second hysteresis value b1.

If the amounts of data stored in the transmit buffers 1b and 2b are kept lower than the first threshold $TH_{LOW}$ plus the second hysteresis value b1 until the first predetermined time expires, the individual MACs 1a and 2a provide the radio packet data service with the number of the plural radio bearers decreased by one at the predetermined data rate and then examining the amounts of data stored in the transmit buffers 1b and 2b at predetermined time intervals. The above procedure is repeated until the end of the radio packet data service.

If the amounts of data stored in the transmit buffers 1b and 2b are increased to be higher than the first threshold $TH_{LOW}$ plus the second hysteresis value b1, the individual MACs 1a and 2a of the mobile station 1 and the network 2 reset the first timer $H_{LOW}$, providing the radio packet data service with the number of the radio bearers unchanged and determining the amounts of data stored in the transmit buffers 1b and 2b at predetermined time intervals. The above procedure is repeated until the end of the radio packet data service.

On the other hand, when the amounts of data temporarily stored in the transmit buffers 1b and 2b are higher than the first threshold $TH_{LOW}$, the individual MACs 1a and 2a of the mobile station 1 and the network 2 compare the amounts of data stored in the transmit buffers 1b and 2b with the second threshold $TH_{HIGH}$, respectively (S10).

When the amounts of data stored in the transmit buffers 1b and 2b are higher than the second threshold $TH_{HIGH}$, the individual MACs 1a and 2a of the mobile station 1 and the network 2 check on whether the second timer $T_{HIGH}$ is set, and if not, setting the second timer $T_{LOW}$ at a second time, and checking at predetermined time intervals on whether the amounts of data temporarily stored in the transmit buffers 1b and 2b are kept below the second threshold $TH_{HIGH}$ until the first predetermined time expires (S11–S14).

If the second timer $T_{HIGH}$ is set, the individual MACs 1a and 2a of the mobile station 1 and the network 2 check at predetermined time intervals on whether the amounts of data temporarily stored in the transmit buffers 1b and 2b keep higher than the second threshold $TH_{HIGH}$ until the second predetermined time expires, respectively.

If he amounts of data temporarily stored in the transmit buffers 1b and 2b keep higher than the second threshold $TH_{HIGH}$ until the second predetermined time expires, the individual MACs 1a and 2a of the mobile station 1 and the network 2 provide the radio packet data service with the number of radio bearers for the predetermined data rate increased by one and examining the amounts of data stored in the transmit buffers 1b and 2b at predetermined time intervals. The above procedure is repeated until the radio packet data service ends (S15).

If he amounts of data temporarily stored in the transmit buffers 1b and 2b are decreased to be lower than the second threshold $TH_{HIGH}$ before the second predetermined time expires, the individual MACs 1a and 2a of the mobile station 1 and the network 2 reset the second timer $H_{LOW}$, providing the radio packet data service with the number of radio bearers unchanged at the predetermined data rate and examining the amounts of data stored in the transmit buffers 1b and 2b at predetermined time intervals. The above procedure is repeated until the end of the radio packet data service (S16).

On the other hand, when examining the amounts of data stored in the transmit butters 1b and 2b at predetermined time intervals and repeating the above procedure, the individual MACs 1a and 2a of the mobile station 1 and the network 2 compare the amounts of data stored in the transmit buffers 1b and 2b with the second threshold $TH_{HIGH}$ inclusive of hysteresis values. Then, the individual MACs 1a and 2a provide the radio packet data service with the number of radio bearers decreased/increased by one, or unchanged according to the comparison result.

That is, the individual. MACs 1a and 2a of the mobile station 1 and the network 2, as shown in FIG. 3, compare the amounts of data stored in the transmit buffers 1b and 2b with the second threshold $TH_{HIGH}$ minus the fourth hysteresis value c1, respectively.

If the amounts of data stored in the transmit buffers 1b and 2b are increased to be higher than the second threshold $TH_{HIGH}$ plus the fourth hysteresis value c1, i.e., change from area "B" to area "C" in FIG. 3, the individual MACs 1a and 2a of the mobile station 1 and the network 2 set the second timer $T_{HIGH}$ at the second predetermined time.

When the amounts of data stored in the transmit buffers 1b and 2b are kept higher than the second threshold $TH_{HIGH}$ minus the third hysteresis value b2 until the second predetermined time expires, the individual MACs 1a and 2a of the mobile station 1 and the network 2 provide the radio packet data service with the number of the radio bearers increased by one and examining the amounts of data stored in the transmit buffers 1b and 2b at predetermined time intervals. The above procedure is repeated until the end of the radio packet data service.

If the amounts of data stored in the transmit buffers 1b and 2b are decreased lower than the second threshold $TH_{HIGH}$ minus the third hysteresis value b2, i.e., change from area "C" to area "B" in FIG. 3 before the second predetermined time expires, the individual MACs 1a and 2a of the mobile station 1 and the network 2 reset the second timer $T_{HIGH}$, providing the radio packet data service with the number of radio bearers unchanged and examining the amounts of data stored in the transmit buffers 1b and 2b at predetermined time intervals. The above procedure is repeated until the end of the radio packet data service.

When the amounts of data stored in the transmit buffers 1b and 2b are lower than the second threshold $TH_{HIGH}$, the individual MACs 1a and 2a check on whether the amounts of data stored in the transmit buffers 1b and 2b are between the first threshold $TH_{LOW}$ and the second threshold $TH_{HIGH}$ (S17).

If the amounts of data stored in the transmit buffers 1b and 2b are between the first threshold $TH_{LOW}$ and the second threshold $TH_{HIGH}$, the MACs 1a and 2a reset the first and second timers $T_{LOW}$ and $T_{HIGH}$, providing the radio packet data service with a predetermined number of radio bearers and examining the amounts of data stored in the transmit buffers 1b and 2b at predetermined time intervals. The above procedure is repeated until the radio packet data service ends (S18, S19).

If the amounts of data stored in the transmit buffers 1b and 2b are not between the first threshold $TH_{LOW}$ and the second threshold $TH_{HIGH}$, the MACs 1a and 2a reset the first and second timers $T_{LOW}$ and $T_{HIGH}$ examine the amounts of data stored in the transmit buffers 1b and 2b and repeat the above procedure.

On the other hand, when examining the amounts of data stored in the transmit buffers 1b and 2b at predetermined time intervals and repeating the above procedure, the individual MACs 1a and 2a of the mobile station 1 and the network 2 compare the amounts of data stored in the transmit buffers 1b and 2b with the first threshold $TH_{LOW}$ inclusive of hysteresis values. Then, the individual MACs 1a and 2a provide the radio packet data service with the number of radio bearers decreased/increased by one, or unchanged according to the comparison result.

That is, in a case where the amounts of data stored in the transmit buffers 1b and 2b belong to the area "B" of FIG. 3, the first and second thresholds $TH_{LOW}$ and $TH_{HIGH}$ inclusive of hysteresis values correspond to the first threshold $TH_{LOW}$ minus the first hysteresis value a1 and the second threshold $TH_{HIGH}$ plus the fourth hysteresis value c1, respectively.

For the amounts of data stored in the transmit buffers 1b and 2b belonging to the area "A" of FIG. 3, the first threshold $TH_{LOW}$ inclusive of the hysteresis value corresponds to the first threshold $TH_{LOW}$ plus the second hysteresis value b1. For the amounts of data stored in the transmit buffers 1b and 2b belonging to the area "C" of FIG. 3, the second threshold $TH_{HIGH}$ inclusive of the hysteresis value corresponds to the second threshold $TH_{HIGH}$ minus the third hysteresis value b2.

As described above, the hysteresis values have a buffering function when the amounts of data change from the area "A", "B" or "C" of FIG. 3 to around the first and second thresholds $TH_{LOW}$ and $TH_{HIGH}$.

When the individual MACs 1a and 2a of the mobile station 1 and the network 2 are removed of all radio bearers, the radio packet data service is interrupted after a predetermined time. If there exists data to be transmitted within the predetermined time, the radio packet data service is resumed with the radio bearers added through a radio bearer adding procedure.

Even when using all the radio bearers initially assigned, the MACs 1a and 2a of the mobile station 1 and the network 2 can establish additional radio bearers in negotiation with each other as long as the amounts of data belong to the area "C" of the transmit buffers.

As described above, the method for controlling asymmetric dynamic radio bearers in a mobile packet data communications system according to the present invention involves use of the radio bearers for the specified data rate corresponding to the data rate according to the radio packet data service to activate a predetermined number of radio bearers only according to the amount of transmit data and vary the data rate. This makes it possible to efficiently use the radio resources and prevent excessive power consumption and signal interference.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for controlling asymmetric dynamic radio beaters in a mobile packet data communications system, comprising:

(a) establishing a plurality of radio bearers having a predetermined data rate;

(b) examining the amount of data stored in a transmit buffer during transmission of mobile packet data; and (c) transmitting the mobile packet data with the number of the radio bearers increased or decreased according to the amount of data wherein, the amount of data stored in the transmit buffer is compared with first and second thresholds $TH_{LOW}$ and $TH_{HIGH}$, and the number of the radio beaters is decreased by one when the amount of data is lower than the first threshold $TH_{LOW}$ and increased by one when the amount of data is higher than the second threshold $TH_{HIGH}$.

2. The method as claimed in claim 1, wherein the number of the radio bearers is not changed when the amount of data stored in the transmit buffer is kept between the first and second thresholds $TH_{LOW}$ and $TH_{HIGH}$.

3. The method as claimed in claim 1, wherein in the step (c), the number of the radio beaters is decreased by one when the amount of data stored in the transmit buffer remains lower than the first threshold $TH_{LOW}$ until a predetermined time expires and increased by one when the amount of data stored in the transmit buffer remains higher than the second threshold $TH_{HIGH}$ until the predetermined time expires.

4. The method as claimed in claim 3, wherein the first and second thresholds $TH_{LOW}$ and $TH_{HIGH}$ are between hysteresis values for preventing frequent changes of the amount of data stored in the transmit buffer.

5. The method as claimed in claim 3, wherein the hysteresis values comprise first and second hysteresis values are opposite to each other with the first threshold $TH_{LOW}$ interposed therebetween and separated from the first threshold $TH_{LOW}$ at a predetermined distance, and third and fourth hysteresis values are opposite to each other with the second threshold $TH_{HIGH}$ interposed therebetween and separated from the second threshold $TH_{HIGH}$ at a predetermined distance.

6. The method as claimed in claim 1, wherein the steps are supported in MAC (Medium Access Control) protocols of a mobile station and a network.

7. A method for controlling asymmetric dynamic radio bearers in a mobile packet data communications system, comprising the steps of:
   (a) storing first and second thresholds $TH_{LOW}$ and $TH_{HIGH}$;
   (b) establishing a plurality of radio bearers having a predetermined data rate;
   (c) comparing the amount of data stored in a transmit buffer with the first and second thresholds $TH_{LOW}$ and $TH_{HIGH}$ during transmission of mobile packet data; and
   (d) decreasing the number of the radio bearers by one when the amount of data is lower than the first threshold $TH_{LOW}$ for a predetermined time and increasing the number of the radio bearers by one when the amount of data is higher than the second threshold $TH_{HIGH}$.

8. The method as claimed in claim 7, wherein the number of the radio bearers is not changed when the amount of data stored in the transmit buffer is kept between the first and second thresholds $TH_{LOW}$ and $TH_{HIGH}$.

9. The method as claimed in claim 7, wherein the first and second thresholds $TH_{LOW}$ and $TH_{HIGH}$ are between hysteresis values for preventing frequent changes of the amount of data stored in the transmit buffer.

10. The method as claimed in claim 7, wherein the first and second thresholds $TH_{LOW}$ and $TH_{HIGH}$ are between hysteresis values for preventing frequent changes of the amount of data stored in the transmit buffer.

11. The method as claimed in claim 10, wherein the hysteresis values comprise first and second hysteresis values are opposite to each other with the first threshold $TH_{LOW}$ interposed therebetween and separated from the first threshold $TH_{LOW}$ at a predetermined distance, and third and fourth hysteresis values are opposite to each other with the second threshold $TH_{HIGH}$ interposed therebetween and separated from the second threshold $TH_{HIGH}$ at a predetermined distance.

12. The method as claimed in claim 7, wherein in the step (d), the number of the radio bearers is decreased by one when the amount of data stored in the transmit buffer keeps lower than the first threshold $TH_{LOW}$ until a predetermined time expires and increased by one when the amount of data stored in the transmit buffer keeps higher than the second threshold $TH^{HIGH}$ until the predetermined time expires.

13. The method as claimed in claim 7, wherein the steps are supported in MAC (Medium Access Control) protocols of a mobile station and a network.

14. An apparatus for controlling asymmetric dynamic radio bearers in a mobile packet data communications system comprising:
   a transmit buffer for temporarily storing transmit data according to a radio data service; and
   controlling means for establishing a plurality of radio bearers for transmission of the transmit data at a data rate corresponding to the radio data service, examining the amount of data stored in the transmit buffer and increasing or decreasing the number of the radio bearers wherein the controlling means determines first and second thresholds for increasing or decreasing the number of the radio bearers.

15. The apparatus as claimed in claim 14, wherein the controlling means is an MAC protocol.

16. The apparatus as claimed in claim 14, wherein the first and second thresholds $TH_{LOW}$ and $TH_{HIGH}$, are between hysteresis values for preventing frequent changes of the amount of data stored in the transmit buffer.

17. The apparatus as claimed in claim 16, wherein the hysteresis values comprise first and second hysteresis values are opposite to each other with the first threshold $TH_{LOW}$ interposed therebetween and separated from the first threshold $TH_{LOW}$ at a predetermined distance, and third and fourth hysteresis values are opposite to each other with the second threshold $TH_{HIGH}$ interposed therebetween and separated from the second threshold $TH_{HIGH}$ at a predetermined distance.

* * * * *